United States Patent
Grover et al.

(10) Patent No.: US 10,796,561 B1
(45) Date of Patent: Oct. 6, 2020

(54) COGNITIVE SAFETY ALERT GENERATION

(71) Applicant: INTERNATIONAL BUSINESS MACHINES CORPORATION, Armonk, NY (US)

(72) Inventors: Vivek Grover, Cary, NC (US); Thomas L. Bien, Cary, NC (US); James P. Eberwein, Raleigh, NC (US); Daniel B. Willis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/566,591

(22) Filed: Sep. 10, 2019

(51) Int. Cl.
| | |
|---|---|
| *G08B 25/01* | (2006.01) |
| *G08B 25/00* | (2006.01) |
| *H04M 1/725* | (2006.01) |
| *G08B 25/10* | (2006.01) |
| *H04W 4/80* | (2018.01) |
| *H04W 4/90* | (2018.01) |

(52) U.S. Cl.
CPC ......... *G08B 25/016* (2013.01); *G08B 25/001* (2013.01); *G08B 25/10* (2013.01); *H04M 1/72538* (2013.01); *H04W 4/80* (2018.02); *H04W 4/90* (2018.02)

(58) Field of Classification Search
CPC .... G08B 25/016; G08B 25/001; G08B 25/10; H04W 4/80; H04W 4/90; H04M 1/72538
See application file for complete search history.

(56) References Cited

U.S. PATENT DOCUMENTS

| | | |
|---|---|---|
| 6,028,514 A | 2/2000 | Lemelson et al. |
| 9,697,721 B1 | 7/2017 | Akuoku |
| 2007/0229254 A1 | 10/2007 | Chen |
| 2011/0208753 A1* | 8/2011 | Sivadas .................. G06F 3/015 707/749 |
| 2012/0242488 A1 | 9/2012 | Wilson |

(Continued)

FOREIGN PATENT DOCUMENTS

| | | |
|---|---|---|
| CN | 108195369 A | 6/2018 |
| GB | 2527139 A | 12/2015 |
| JP | 2006302099 A | 11/2006 |

OTHER PUBLICATIONS

Anonymous, "A Device and Method for Children Emergency Alarming," ip.com; IPC0M000242990D, Sep. 6, 2015, 4 pages.

*Primary Examiner* — Joseph E Dean, Jr.

(74) *Attorney, Agent, or Firm* — Conley Rose, P.C.

(57) ABSTRACT

Aspects of the disclosure provide for a computer-implemented method. Examples of the method include receiving internal data points from a plurality of sensors associated with a person, the internal data points including at least situational data and biological data, receiving external data points, and comparing the internal data points to the external data points and a profile of the person. The method further includes analyzing the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person, comparing the weighted value to a threshold value, and providing an alert when the weighted value exceeds the threshold value.

17 Claims, 6 Drawing Sheets

(56) References Cited

U.S. PATENT DOCUMENTS

| | | | |
|---|---|---|---|
| 2014/0089024 A1* | 3/2014 | Mason | G06Q 10/06 |
| | | | 705/7.12 |
| 2018/0040230 A1 | 2/2018 | Benoit et al. | |
| 2018/0114125 A1* | 4/2018 | Ichiboshi | G10L 25/63 |
| 2018/0204445 A1 | 7/2018 | Bereshchanskiy et al. | |
| 2019/0200932 A1* | 7/2019 | Noh | A61B 5/02416 |

\* cited by examiner

COGNITIVE SAFETY ALERT GENERATION

BACKGROUND

The present disclosure relates to the field of cognitive processing, and more specifically to performing cognitive processing to determine and provide safety alerts according to states of an electronic device and cognitive states of a person.

A person requesting safety alerts can oftentimes have an electronic device nearby and the electronic device can have a button or a software application icon that the person can access to warn of a situation in which the person perceives harm is possible, e.g., a safety alert condition. The button or icon can be depressed by the person when that person detects the safety alert condition. The electronic device, often a mobile electronic device, can communicate an alert through cellular communication, other forms of wireless communication, and/or other mechanisms. The alert can be sent to an emergency services provider or monitoring agency to notify the emergency services provider or monitoring agency to send help. Depressing the button, icon, or other electronic device signaling mechanism generally requires human intervention. The application launch, button actuation, or icon activation may not account for instances in which the electronic device crashes, is damaged, or is switched off. If the device is off or is destroyed by someone physically assaulting the person or seeking to prevent the person from actuating a button or icon to warn of the safety alert condition then any actuation on the device by the person being assaulted would not trigger an alert because the underlying software functionality of the device would be inoperable. Activation of an application or button also may not take into account the cognitive state of the person perceiving themselves to be in harm's way. The button can therefore be incorrectly actuated by a person who is not placed in a perceived or reasoned cognitive state of harm despite their personal belief otherwise.

SUMMARY

Aspects of the disclosure provide for a computer program product for determining a cognitive safety alert. The computer program product comprises a computer readable storage medium having program instructions embodied therewith. When executed by a processor, the instructions cause the processor to receive internal data points from a plurality of sensors, the internal data points including at least situational data and biological data, receive external data points, and compare the internal data points to the external data points and to a profile of a person. The instructions further cause the processor to analyze the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person. The instructions further cause the processor to compare the weighted value to a configurable threshold value and provide an alert when the weighted value exceeds the threshold value.

Other aspects of the present disclosure provide for a computer implemented method. In at least some examples, the method includes receiving internal data points from a plurality of sensors associated with a person, the internal data points including at least situational data and biological data, receiving external data points, and comparing the internal data points to the external data points and to a profile of the person. The method further includes analyzing the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person. The method further includes comparing the weighted value to a configurable threshold value and providing an alert when the weighted value exceeds the threshold value.

Other aspects of the disclosure provide for a system comprising. In at least some examples, the system includes a processor configured to receive internal data points from a plurality of sensors associated with a person, the internal data points including at least situational data and biological data, receive external data points from, and compare the internal data points to the external data points and to a profile of the person. The processor is further configured to analyze the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person. The processor is further configured to compare the weighted value to a configurable threshold value and provide an alert when the weighted value exceeds the threshold value.

DETAILED DESCRIPTION

Figure 1:
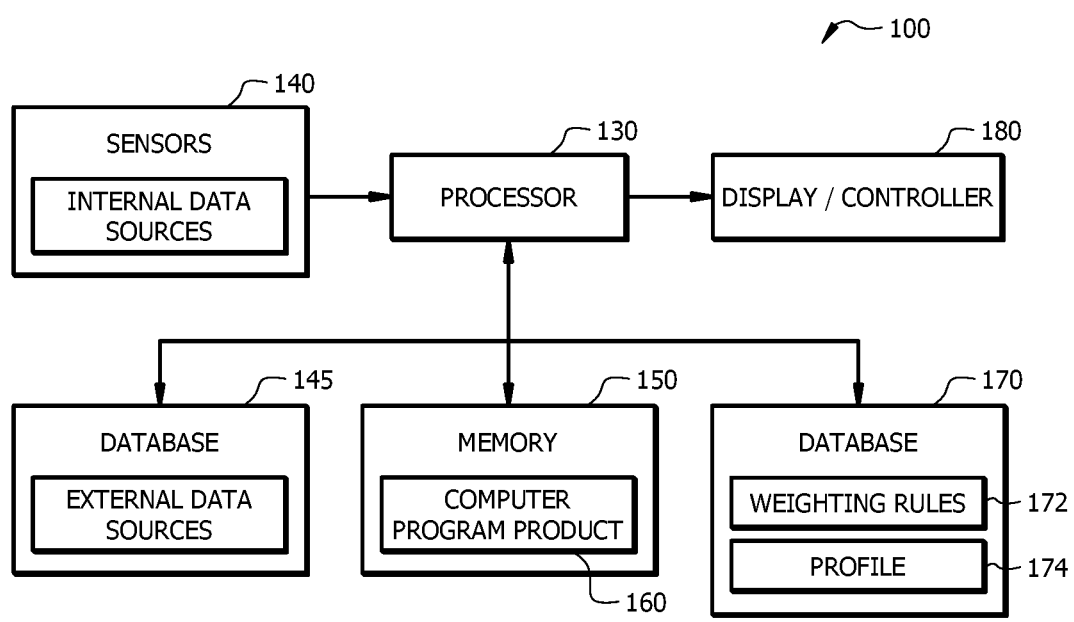
FIG. 1 depicts a computing device according to an embodiment of the present disclosure.

A cognitive safety alert system includes a system that can apply pre-determined weighting rules to data regarding a person being monitored and the situational and contextual conditions surrounding that person to determine meaning from the data regarding the person as it relates to a potential threat to that person. The cognitive system takes into account structured and unstructured data in the form of images, sounds, a location of the person, surroundings of the person being monitored, verbal exchanges (e.g., as analyzed according to natural language processing (NLP) techniques), bio-feedback of the emotional and/or biological condition of the person (such as vital signs, blood pressure, heart-rate, body temperature, body odor, body sweat, fingerprints from touch sensors associated with the personal electronic device, etc.), and battery levels or operational status of the device performing the monitoring of the person. Based on the monitoring, in some circumstances, the cognitive system issues an alert. The images, videos from a camera of, or proximate to, the device, sounds from a microphone of, or proximate to, the device, location and position from a geographic position tracker or sensor of, or coupled to, the electronic device, and various biological and emotional sensors coupled to the person's body and communicatively linked to the electronic device, etc., form internal data points. The structured and unstructured data of the internal data points may be processed in conjunction with patterns established by the person's social habits available or determined from, for example, social media sites or online social media profiles, as well as the person's biological and emotional profile. Based on the processing, the cognitive system evaluates and determines whether there is a potential threat to the safety of the person and can thereafter issue an alert when appropriate. The patterns or profile of the person can be compared to external data points and/or data sources. The external data points can be of the person being monitored or other people in proximity to the person. Examples of information regarding such other people near the person being monitored that may be of interest to the cognitive safety alert system is whether such people have criminal records and/or are, or have recently been, expressing anger or harmful behavior generally, toward the person being monitored, or to a class to group of people to which the person being monitored belongs or could reasonably be perceived to belong.

In various embodiments, the electronic device associated with the person includes, or couples to, a Global Positioning Satellite (GPS) or other geographic position tracker or sensor that enables accurate capture of satellite or other aerial-based images of a geographic area proximate to the person while the electronic device corresponding is in the geographic area proximate to the person. The person's electronic device can issue an alert to notify an entity if the device is abruptly turned off or thrown away, for example, by also monitoring battery levels in addition to the geographic location of the electronic device. By monitoring social media, a profile (e.g., a behavioral profile) of the person, such as where the person would normally be at a particular time of day, can be compared to the geographic location of the electronic device to determine if the device may have been discarded or turned off, such as by an individual wishing and/or attempting to do harm to the person being monitored. Moreover, the cognitive alert system monitors the sensor data of the person (e.g., such as biometric sensor data), the battery sensor, the image sensor, and/or the voice sensor to determine whether it is possible that the person may be in harm's way. In some examples, when one or more of the sensors detect an individual's face (an unknown individual) other than the face of the person being monitored, the cognitive alert system compares captured data regarding the unknown individual (e.g., image sensor data and/or voice sensor data) to a criminal database to determine whether the unknown individual has a criminal record. If the voice is determined, based on the weighted rules, to be a threatening voice not of the person being monitored but of a criminal whose image detected by the image sensor matches a criminal database facial image, then a larger numerical weight can be applied to that circumstance and a higher weighted value will result. In the aforementioned example, the higher weighted value will most likely exceed a pre-determined threshold value, and an alert will be sent either to the person being monitored to notify the person of impending harm, to an emergency services provider or monitoring agency along with the geographic location of the person being monitored and/or other captured information, such as an identification of the criminal who is assessed to be placing the person being monitored in harm's way, or both.

The cognitive system, according to one embodiment, determines the cognitive state of the person based on sensor output (e.g., such as at least some of the internal data points) compared to the profile of that person to formulate a first cognitive dimension. The sensor data can also be compared to external data points to formulate, for example, a second cognitive dimension. Accordingly, in various examples the internal data points can be compared to the external data points and/or to the profile of the person being monitored. The first cognitive dimension may be, for example, the emotional and/or biological mental perception and meaning or mood attributable to a person that may or may not be in harm's way. The second cognitive dimension can relate to the mental process of the person in relation to the situational and contextual surroundings of what that person perceives as a harmful condition, as indicated by the internal data points and/or the external data points. If the first and second cognitive dimensions are determined as a relatively high weighted value based on the applied weighting rules, then an appropriate alert will be issued (e.g., transmitted to an entity, in some circumstances). Moreover, even if the electronic device is switched off, destroyed, discarded, or has insufficient power to operate to receive internal data points, the combination of external data points and the profile of the person obtained from, for example, social media, may be used to aid in determining whether the person is in harm's way. For example, internal data points captured by the electronic device can be transmitted to a device other than the electronic device prior to the electronic device being switched off, destroyed, discarded, or having insufficient power, where that device other than the electronic device implements at least a portion of the cognitive alert system, such as comparing an image captured by the electronic device camera to a criminal database. Alternatively, the profile of the person, based on where the person would regularly be at a given time (e.g., that the person would normally jog at that time of day) can be compared by the device other than the electronic device to internal data points to determine a possible harmful condition (e.g., a safety alert condition). Further, tracking the geographic location of the electronic device corresponding to the person and comparing that geographic location to where that person would normally be at that time of day (e.g., as determined via social media) can also yield information regarding a possible harmful condition if the person is not at the expected and/or customary geographic location during that time. The above are merely a limited set of examples in which internal and external data points and a profile of the person can be compared and/or analyzed to determine first and second cognitive dimensions and to provide an appropriate alert based on weighted values and weighting rules. Further examples are set forth below.

With reference now to FIG. 1, a schematic diagram of an illustrative personal electronic device or computing device 100 is shown according to an embodiment of the present disclosure. Computing device 100 may be any suitable processing device capable of performing the functions disclosed herein such as a computer system, a server, a cloud computing node, or may be generally representative of a distributed computing device in which one or more components of computing device 100 are distributed or shared across one or more other devices. Computing device 100 is configured to implement at least some of the features/ methods disclosed herein, for example, the cognitive safety alert as described with respect to the method 200, system 300, or any other embodiments discussed throughout the present disclosure. The features/methods of this disclosure are implemented using hardware, firmware, and/or software installed to run on hardware. At least some examples of the computing device 100 may be further configured to operate within a cloud computing environment, such as a cloud computing environment 50, discussed below with respect to FIGS. 5 and 6.

Computing device 100 is a programmable device that, in some examples, can be implemented as a cloud computing node within a cloud computing environment. The computing device 100 can be communicatively coupled to a person being monitored and is capable of being at least partially implemented through a computer program product to perform any of the functionality or methodology set forth in the present disclosure. Other examples of computing devices suitable for implementation as the computing device 100 include, for example, personal computer systems, server computer systems, thin clients, thick clients, hand-held or laptop devices, multiprocessor systems, microprocessor based systems, set-top boxes, network computers, minicomputer systems, mainframe computer systems, tablet devices, smart phone devices, wearable electronic devices, and distributed cloud computing environments that include any of the above, or similar, systems or devices.

Computing device 100 may be described in the general context of computer system-executable instructions, such as program modules, being executed by a computer system. Generally, program modules may include routines, programs, objects, components, logic, data structures, and so on that preform particular tasks or implement particular abstract data types. Computing device 100 may be practiced and distributed in cloud computing environments where tasks are performed by remote processing devices that are linked through a communications network to one another and to the computing device 100. In a distributed cloud computing environment, program modules may be located in both local (e.g., the computing device 100) and remote computer (e.g., cloud computing node) system storage media, including memory storage devices.

The components of computing device 100 may include, but are not limited to, one or more processors 130 or processing units, memory 150, and various buses that couple system components, including memory 150 to processor 130. The bus architecture represents memory busses, peripheral busses, accelerated graphics port busses, local busses, and communicate using industry standard architecture (ISA) bus, microchannel architecture (MCA) bus, enhanced ISA (EISA) bus, video electronics standards association (VESA) local bus, and/or a peripheral component's interconnect (PCI) bus, as well as a possibility for other unnamed busses.

Processor 130 can be implemented as a general processor (e.g., a central processing unit (CPU)) or as part of one or more applications specific integrated circuits (ASICs), field-programmable gate arrays (FPGAs), and/or digital signal processors (DSPs).

Memory 150 is coupled to processor 130 and is a non-transitory medium configured to store various types of data. Memory 150 comprises memory devices including secondary storage, read-only memory (ROM), and random-access memory (RAM). Secondary storage is typically comprised of one or more disc drives, optical drives, solid-state drives (SSDs), and/or tape drives and is used for non-volatile storage of data and as an over-flow storage device if the RAM is not large enough to hold all working data. Secondary storage is used to store programs that are loaded into the RAM when such programs are selected for executed. The ROM is used to store instructions and perhaps data that are read during program execution. The ROM is a non-volatile memory device that typically has a small memory capacity relative to the larger memory capacity of a secondary storage. The RAM is used to store volatile data and perhaps to store instructions. Access to both the ROM and RAM is typically faster than to the secondary storage.

The memory 150 may be used to house the instructions for carrying out the various embodiments described herein. For example, alternatively, the memory 150 may comprise a cognitive safety alert computer program product 160, which is executed according to instructions received from, and/or executed by, processor 130.

It is understood that by programming and/or loading executable instructions onto computing device 100, at least one of the processor 130 and/or the memory 150 are changed, transforming computing device 100 in part into a particular machine or apparatus, for example, a cognitive safety alert device having the novel functionality taught by the present disclosure. It is fundamental to the electrical engineering and software engineering arts that functionality can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present disclosure may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, as noted above, an erasable programmable ROM (EPROM or Flash memory), a static RAM (SRAM), a portable compact disc ROM (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, ISA instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further noted in FIG. 1, computer system 100 can include, or be coupled to, a plurality of sensors 140, each of which can be communicatively coupled to processor 130. Sensors 140 detect and send various internal data points, whether they are voice, image, position (e.g., geographic location), biological, emotional, battery, or electronic device actuation, to processor 130. Sensors 140 thereby transmit situational and biological internal data points from the sensors 140 to the processor 130. In addition to the processor 130 receiving the situational and biological internal data points, in at least some examples at substantially real-time, in other examples the internal data points are received at periodic intervals. Processor 130 can also receive external data points from a data source comprising, for example, an external database 145. The external database 145, in some examples, includes external data points from publicly and/or privately accessible data sources. The external data points can be sent from the external database to the processor 130 through a wireless connection utilizing, for example, a mobile Internet connection or other communications connectivity of the computing device 100, for example, using one or more antennas, receivers, transceivers, etc. In various examples the external data points can be sent on demand or at regular periodic intervals to processor 130.

In addition to the external database, in some examples the computing device 100 can also access a secondary database 170 comprising weighting rules 172 and profile 174. Alternatively, instead of weighting rules 172 being within a database 170, in some examples the weighting rules 172 can be within memory 150. Similarly, profile 174 can be also within memory 150. In whatever form, the weighting rules 172 and profile 174 can be addressable and be read by the processor 130. The processor 130 forwards a read command and, on demand, accesses the weighting rules 172 and/or the profile 174. The weighting rules 172 are applied by the processor 130 to determine at least one weighting value depending on a first cognitive dimension and a second cognitive dimension. The profile 174 is pre-defined (e.g., previously stored and thereafter read) data regarding voice, image, position, biological, emotional, battery, and/or device status to which the internal data points are compared and which is indicative of expected values of, or value ranges for, the various internal data points at a particular time, corresponding to a particular location, or the like. The comparison by the processor 130 between the internal data points and the profile 174 can determine, depending on a weighted value applied to the comparison output according at least partially to the weighting rules 172, to issue an alert or take other action based on setting provided to the computing device 100 by the person being monitored by the computing device 100.

The alert, resulting from the analyzing and comparing performed by the processor 130, is either provided to an output device 180 (e.g., such as a display, speaker, or other audible and/or visual alert component) to cause the alert to be received by the person, notifying the person of a possible safety hazard. Alternatively, or additionally, the alert is sent by processor 130 to an emergency services provider or monitoring agency via the output device 180 (e.g., such as an antenna capable of communicating via a communications network) without intervention by the person, if the person has provided an appropriate setting on the computing system 100 to enable and/or permit such automatic transmission functionality. In yet other examples, the alert is sent to emergency services provider or monitoring agency after expiration of a delay period if the person does not first cancel sending of the alert, for example, by entering a passcode or performing other actuation of the computing device 100.

Figure 2:
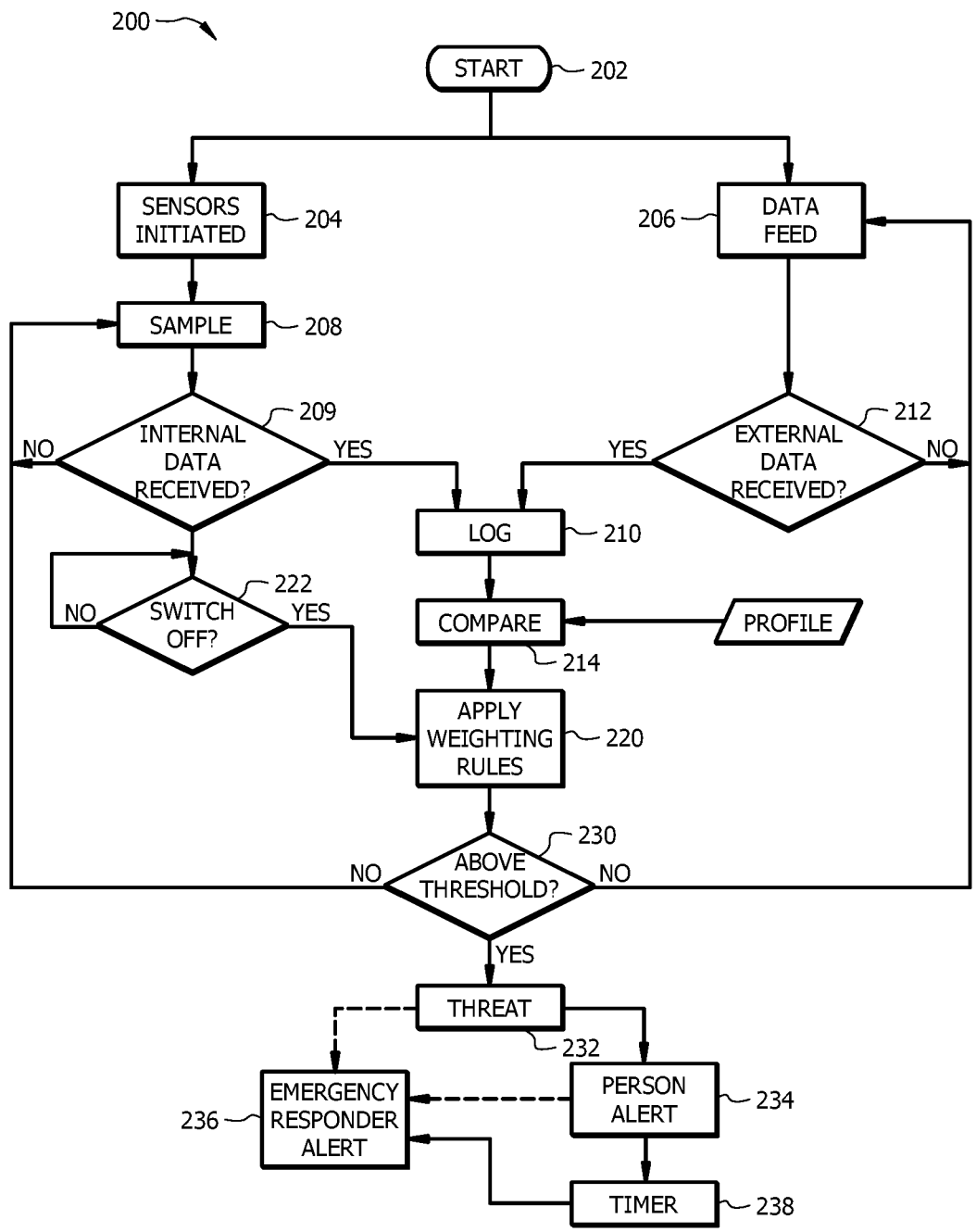
FIG. 2 depicts a flowchart of a method for determining a cognitive safety alert according to an embodiment of the present disclosure.

Turning now to FIG. 2, a flow chart of an illustrative method 200 for determining a safety alert is depicted. The safety alert is determined, in at least some examples, using cognitive functioning and/or processing methodology in which a weighted value is determined according to cognitive processing of emotional, biological, situational, and contextual conditions surrounding a person being monitored. Method 200 is a computer-implemented method, implemented by a computing device, such as the computing device 100 of FIG. 1, to determine a cognitive safety alert based, at least in part, on one or more cognitive dimensions having a relationship to a person undergoing safety monitoring, as well as the surroundings of that person. The disclosed embodiments of method 200 have an advantage of determining a cognitive safety alert according to the cognitive dimensions of the person, as well as the locations and surroundings of that person, thereby creating a more accurate assessment of the real or perceived (e.g., cognitive mental state determined) safety of that person. It should be understood that the following steps of method 200 may be implemented in any order and are not limited based on the order of discussion herein.

At step 202, the cognitive safety alert methodology begins, followed by the sensors being initiated at step 204 and data being received at step 206 from external data points. The sensors, once initiated, take samples at step 208 of internal data points. Sampling can occur at regular periodic intervals that can be the same for each sensor, at different periodic intervals, or at non-periodic intervals. If the internal data points are determined by the processor at step 209 to have not been received, the method 200 returns to step 208 at which sampling is repeated. Once sampled, the internal data points are received by a processor and logged at step 210. Along with logging of the internal data points at step 210, a determination of receipt of external data points can be made at step 212 and the received external data points also logged at step 210. Similar to the internal data points, if the external data points are determined by the processor at step 212 to have not been received, the method 200 returns to the step 206. Logging of the internal data points and external data points at step 210 allows a comparison to be made by the processor at step 214 of the internal data points to the external data points, as well as, in some examples, a profile of a person being monitored pursuant to the method 200.

At step 220, the processor applies weighting rules to the outcome of step 214 and the status of the computing device. For example, if the computing device reads at step 222 a significantly low battery level similar to a switch off condition, the switch off condition determined at step 222 can receive its own unique weighting rule at step 220 that may be different from the weighting rule applied to the outcome of step 214.

If the weighted value determined according to the weighting rules and depending on the first and second cognitive dimensions is determined by the processor at step 230 to be above a threshold, then a threat is determined to exist at step 232. If the weighted value is determined by the processor at step 230 to not exceed the threshold, the method 200 returns to step 208 and sensor sampling continues for a next sensor reading and the external data point receipt continues at step 206 for the next external data point. However, if a threat is determined to exist at step 232, then the person being monitored is sent an alert by the processor, either visually, audibly, or both via, for example, a computing device at step 234. The person can either control the computing device to forward the alert to an emergency responder or other monitoring agency at step 236 or, alternatively, if the person does not send the alert within a specific time-out time determined at step 238, then the alert will be forwarded to the emergency responder or monitoring agency at step 236 without intervention by the person. Still further, as another embodiment, the alert can be sent by the computing device directly to the emergency responder or monitoring agency at step 236 automatically without being sent to the person or the person's computing device and/or without action or intervention of the person, bypassing step 234 and step 238. This outcome can be enabled by the person establishing and/or enabling a setting on the computing device to cause the alert signal to be sent directly to the emergency responder or monitoring agency at step 236 without intervention by the person at, or following, step 234.

Figure 3:
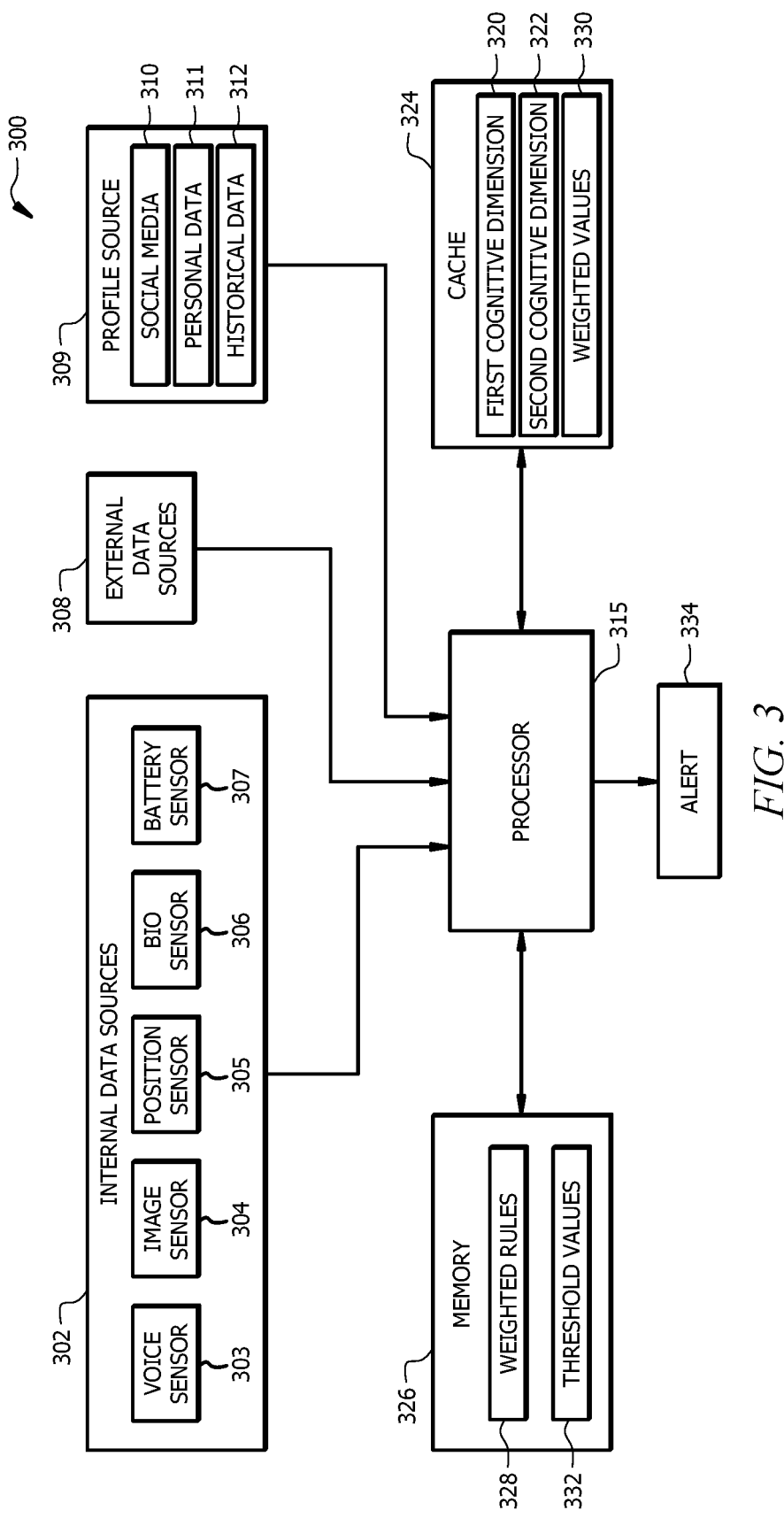
FIG. 3 depicts a block diagram of a system for determining a cognitive safety alert according to an embodiment of the present disclosure.

Turning now to FIG. 3, a block diagram of a system 300 for determining a cognitive safety alert is depicted. In some examples, the system 300 is representative of at least some components of the computing device 100. For example, a processor 315 of the system 300 may be substantially similar to the processor 130, at least some of the internal data sources 302 may be substantially similar to the sensors 140, the memory 326 may include the database 170 such that the weighting rules 328 are substantially similar to the weighting rules 172, etc. In other examples, the system 300 is representative of an architecture in which one or more components of the system 300 are implemented in a component that is proximate to a person being monitored. For example, at least some of the internal data sources 302, the processor 315, and/or the cache 324 may be implemented in a component that is proximate to the person being monitored while a remainder of components of the system 300 are implemented remotely and communicatively coupled to the component that is proximate to the person being monitored. In yet other examples, at least some of the internal data sources 302 and an output device (not shown) are implemented in the component that is proximate to the person being monitored and a remainder of the components of the system 300 are implemented remotely (e.g., such as at least some of the remaining components of the system 300 being implemented in a cloud-computing environment).

Internal data sources 302 generate and output one or more internal data points to the processor 315. The internal data points are generated by one or more sensors included among the internal data sources 302. The sensors can include a voice sensor 303, an image sensor 304, a position (or location) sensor 305, biological (e.g., heart rate, pulse rate, breathing, body sweat, body odor, fingerprints, etc.) sensor 306 and/or battery (e.g., power level, activation status, on/off, etc.) sensor 307. The internal data sources generate and/or output the internal data points at any combination of real-time and/or intervals (periodic or non-periodic), in some examples representing cognitive situational and biological data having relation to a person being monitored by the system 300. External data sources 308 provide one or more external data points to the processor 315 in either real-time or at time delayed periodic or non-periodic intervals. A profile source 309 further provides a profile of the person being monitored by the system 300 to the processor 315. While illustrated separately, in at least some examples the profile source is an element of the memory 326. The profile source 309, in at least some examples, includes or receives data from a social media source 310, a personal data source 311 (e.g., biological, voice, and/or facial image of the person such as benchmark information of the person), and/or historical data source 312.

The processor 315 receives the internal data points from the internal data sources 302, the external data points from the external data sources 308, and the profile from the profile source 309 and compares the data to generate a first cognitive dimension 320 and a second cognitive dimension 322, each as discussed elsewhere herein, and stores the first cognitive dimension 320 and the second cognitive dimension 322 in a cache 324 for further use and/or processing by the processor 315. Subsequently, the processor 315 retrieves and analyzes the first cognitive dimension 320, the second cognitive dimension 322, as well as the internal data points from the internal data sources 302, the external data points from the external data sources 308, and the profile from the profile source 309 by applying weighting rules 328 to determine one or more weighted values 330 that are also stored by the processor 315 in the cache 324. By receiving each of the first cognitive dimension 320, the second cognitive dimension 322, the internal data points, and the external data points, the processor 315 is able to determine whether an actual harmful condition exists proximate to the person being monitored by the system 300 or the person being monitored by the system 300 perceives a harmful condition to exist proximate to their person and the analysis performed by the processor 315 reveals that perception to be unsupported by observed criteria or evidence. The weighting rules 328, in at least some examples, are stored in a memory 326 for access by the processor 315. In other examples, the weighting rules 328 are received from an external data source 308. The weighted values depend on the first cognitive dimension 320 of an emotional and biological condition of the person and the second cognitive dimension 322 of a situational and contextual condition surrounding the person. The processor 315 then compares the weighted values 330 to a configurable threshold value 332. The threshold value 332, in at least some examples, is stored in the memory 326 for access by the processor 315. In other examples, the threshold value 332 is received from an external data source 308. When the weighted values 330 are greater than the threshold value 332, the processor 315 outputs alert 334. When the weighted values 330 are not greater than the threshold value 332, the processor 315 again performs a comparison between the internal data points, the external data points, and the profile to generate new weighted values, repeating the process described above.

In at least some examples, the first cognitive dimension 320 is indicative of an emotional and biological condition (e.g., cognitive state) of the person attributable to the internal data points output by at least some of the internal data sources 302 and/or represented by a profile output by the profile source 309. The first cognitive dimension 320 may indicate, for example, a positive emotion or mental state associated with one or more of the internal data points, or a negative emotion associated with one or more of the internal data points. For example, based on the voice or image taken of the monitored person, or the body odor or the body sweat taken of that person, a comparison can be made to that person's historical data of the person's profile to determine if the person is expressing joy, disappointment, or more relevantly, feels threatened or scared. The first cognitive dimension 320 can then be analyzed by the processor 315 relative to certain weights (e.g., the weighting rules 328) given to that person's expression, voice, or biological sensing where, for example, a scream is given a higher weighted rule than laughter. Accordingly, a high-pitched scream or curling of the person's lips or squinting of the person's eyes will receive a higher weighted value 330 than a calm voice, laughter, or a calm appearance on the person's face (as compared to the person's profile). That weighted value 330 can then be compared to the threshold value 332 and, when the weighted value 330 exceeds the threshold value 332, the alert 334 can be output by the processor 315.

In at least some examples, the second cognitive dimension 322 is similar to the first cognitive dimension 320, but primarily focuses on the situation or circumstance surrounding the person rather than on the person himself or herself. For example, an image (e.g., such as captured by the image sensor 304 or received from an external data source 308) of a stranger's face near the person can be compared to an external data point received from the external data source 308 to determine if the stranger is, for example, a criminal who matches the criminal database in the data fed accessible source and, thusly, a higher weighting rule 328 can be applied than if the stranger's face is not that of a criminal. The weighting rule 328 applied to the different first and second cognitive dimensions and the outcome of the comparison performed by the processor 315 between the internal data points, external data points, and the profile, produces the weighted values 330. For example, a detected criminal's face (e.g., as indicated by the image sensor 304 and the external data source 308) and a loud shrieking voice (e.g., as indicated by the voice sensor 303) of the person, as well as possibly deactivation of the computing device (e.g., as indicated by the battery sensor 307) associated with the person yields a significantly high weighted value 330 which would surpass the threshold value 332 causing the processor 315 to output the alert 334.

The analysis and application by the processor 315 of the weighting rules 328 is performed at least partially according to machine learning. The machine learning is fundamentally incapable of performance in the mind of a person, as the concept of machine learning is to provide a degree of artificial intelligence to a non-human entity. As an example of the machine learning that leads to generation and/or modification of the weighting rules 328, a hateful social media posting from a stranger whose face is detected nearby the person being monitored and who has been identified as a possible bad actor according to a match of the stranger's face being found in the criminal database will cause the presence of the stranger nearby the person being monitored to carry significantly more weight in the weighting rules 328 compared to the weight of a person's biological data that fluctuates periodically during the day.

Additionally, different sequences of events carry different weights. For example, a hateful social media posting from the stranger whose image found a match in the criminal database followed by a heated conversation between the stranger and the person being monitored, accompanied by the person's heart rate's rapid fluctuation, carry lesser weight than a hateful social media posting from the stranger whose image found a match in the criminal database followed by sudden system switch off of the system 300 (or a component of the system 300 that is proximate to the person being monitored, such as an electronic device carried by the person being monitored). Furthermore, the weighting rules 328 may be modified by a user, such as in response to changing user preferences such as daily routine, or dynamically through a machine-learning approach to learning the user's actions and habits. For example, if a user identifies a new preferred running route that varies from an old running route, the user may modify a weighting rules 328 associated with the old running route such that deviation from the old running route during a time that the user would normally be running is given a lesser weighted value 330. Alternatively, based on a machine-learning approach the system 300 may determine after several runs by the user that the user has selected a new preferred running route and may update the weighting rules 328 to give lesser weight to deviation from the old running route and greater weight to deviation from the new running route.

Based on these weights and priorities, the weighted value 330 is determined and when the weighted value 330 meets or exceeds the threshold value 332, then the alert 334 is output. The alert 334 can be output to the component of the system 300 that is proximate to the person being monitored so that if it is a false alert the person has the ability to acknowledge and/or cancel the alert. However, if the person does not respond in a predetermined time period, or responds with an invalid (e.g., not authenticated) response, then the alert is sent to an emergency responder, monitoring agency, or other third-party. The system 300 can also create a log of all occurrences and data captured on, for example, the component of the system 300 that is proximate to the person being monitored so that even if the mishap is not prevented, it could be visited as part of a reactive investigation to determine the cause of a mishap. The log could be stored in the memory 326, in external data storage (not shown), or both.

Accordingly, the system 300 has cognitive ability based on at least some certain sensors (e.g., internal data source 302) being proximate to the person's body. The system 300 further has the ability to store and/or receive personal profile data like voice recognition, basic statistics of a person such as average heart rate, other vital signs, customary location coordinates, etc. over a period of time or activity. The system 300 also has the ability to capture external data points or threat signals based on external data sources 308 and the sensors can detect other biological functions, such as blood pressure, heart rate, body temperature, body odor, heavy breathing, body sweat from the touch of the person being monitored, fingerprints of anyone touching the component of the system 300 that is proximate to the person being monitored, and places such information into a periodic log. An example, albeit not limiting in any way to embodiments of this disclosure, is a person who is going out for a run on a trail. The image sensor 304 on the component of the system 300 that is proximate to the person being monitored will capture images surrounding that person, and the history and social profile of the person will indicate where that person usually goes for a run at this particular time of day or hour. A satellite or other aerial image received from an external data source 308 of that area can be compared with images captured by the image sensor 304, in conjunction with the real-time verbal conversations, vital signs, abnormality in breathing, changes in body odor, temperature, etc. As the images of other strangers on the running trail are captured, a facial recognition is performed to find a potential match in criminal record databases. Conversations including high-pitch screaming, crying, loud shrieks, etc. are processed, for example, through NLP, and suspicious conversations are detected. If the component of the system 300 that is proximate to the person being monitored is suddenly switched off or becomes otherwise unresponsive, yet battery levels in the logged internal data points show a healthy charge percentage, all the aforesaid parameters are processed and/or as per any pre-defined rules to determine the overall threat level (e.g., the determined weighted value) and a determination is made whether the person jogging on the trail has a threat of being abducted.

Figure 4:
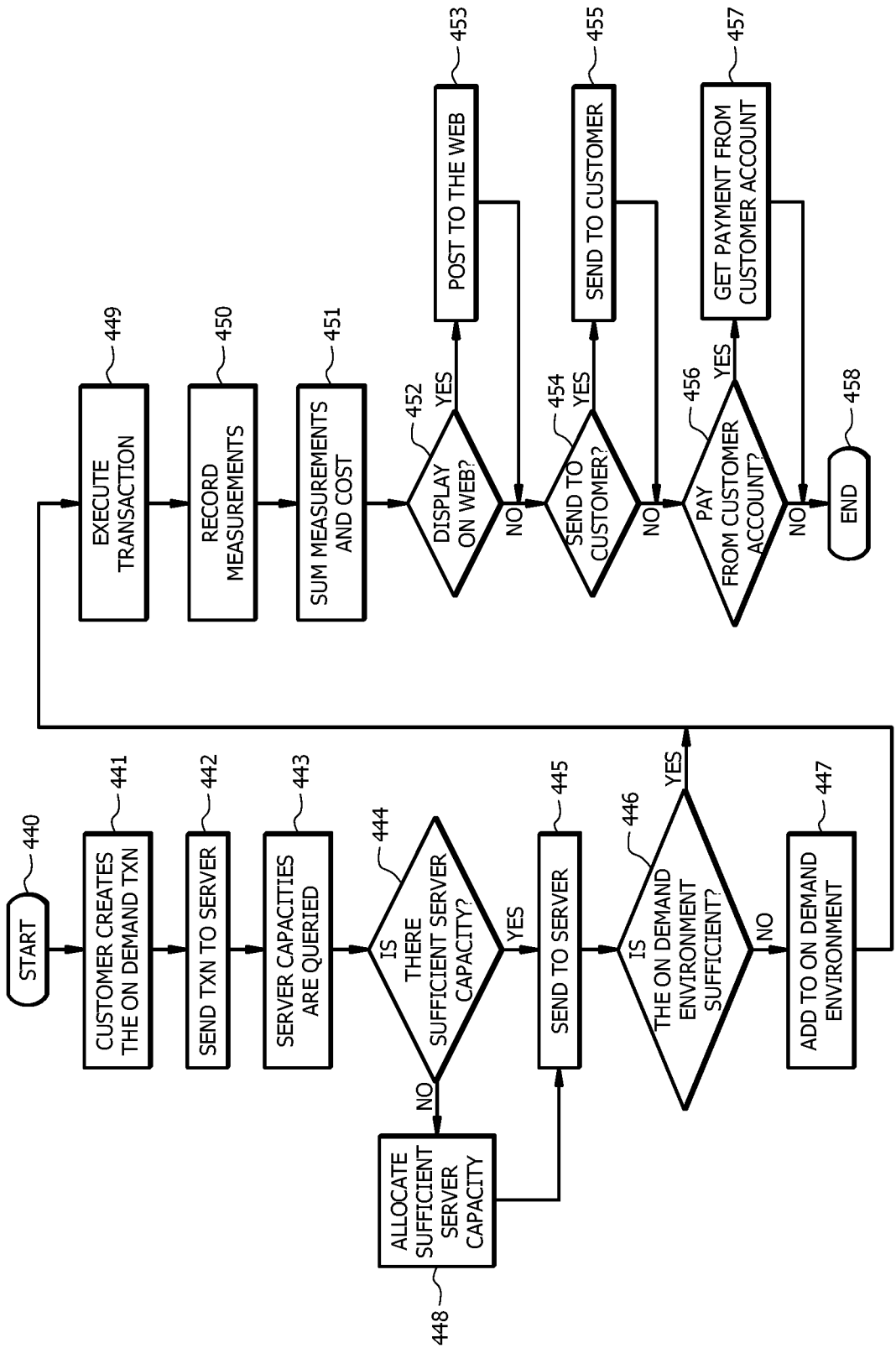
FIG. 4 depicts a flowchart of an on-demand service process according to an embodiment of the present disclosure.

Turning now to FIG. 4, a flowchart of an on-demand service process according to an embodiment of the present disclosure is shown. The process software (e.g., the cognitive safety alert computer program product discussed above with respect to the computing device 100) is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions (Txns) that contain data and server processing requests that use central processing unit (CPU) units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 440 begins the On Demand process. A transaction is created that contains the unique customer identification, the requested service type, and any service parameters that further specify the type of service 441. The transaction is then sent to the main server 442. In an On Demand environment, the main server can initially be the only server, and then as capacity is consumed other servers are added to the On Demand environment.

The server CPU capacities in the On Demand environment are queried 443. The CPU requirement of the transaction is estimated, and then the server's available CPU capacity in the On Demand environment is compared to the transaction CPU requirement to see if there is sufficient CPU available capacity in any server to process the transaction 444. If there is not sufficient server CPU available capacity, then additional server CPU capacity is allocated to process the transaction 448. If there was already sufficient available CPU capacity, then the transaction is sent to a selected server 445.

Before executing the transaction, a check is made of the remaining On Demand environment to determine if the environment has sufficient available capacity for processing the transaction. This environment capacity consists of such things as, but not limited to, network bandwidth, processor memory, storage etc. 446. If there is not sufficient available capacity, then capacity will be added to the On Demand environment 447. Next the required software to process the transaction is accessed, loaded into memory, and then the transaction is executed 449.

The usage measurements are recorded 450. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (451).

If the customer has requested that the On Demand costs be posted to a web site (452), then they are posted thereto 453. If the customer has requested that the On Demand costs be sent via e-mail to a customer address 454, then they are sent 455. If the customer has requested that the On Demand costs be paid directly from a customer account 456, then payment is received directly from the customer account 457. On Demand process proceeds to 458 and exits.

Figure 5:
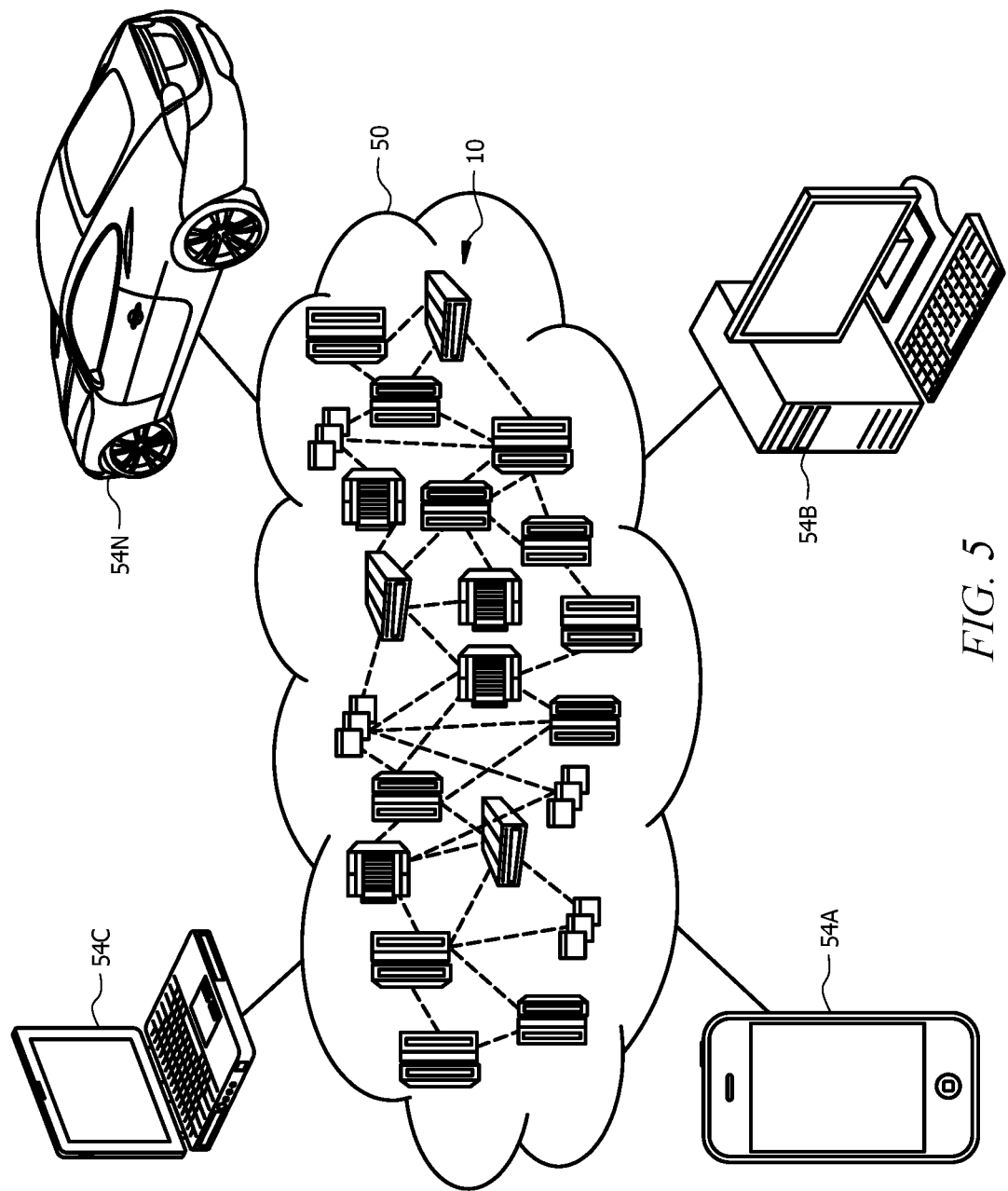
FIG. 5 depicts a cloud computing environment according to an embodiment of the present disclosure.
Figure 6:
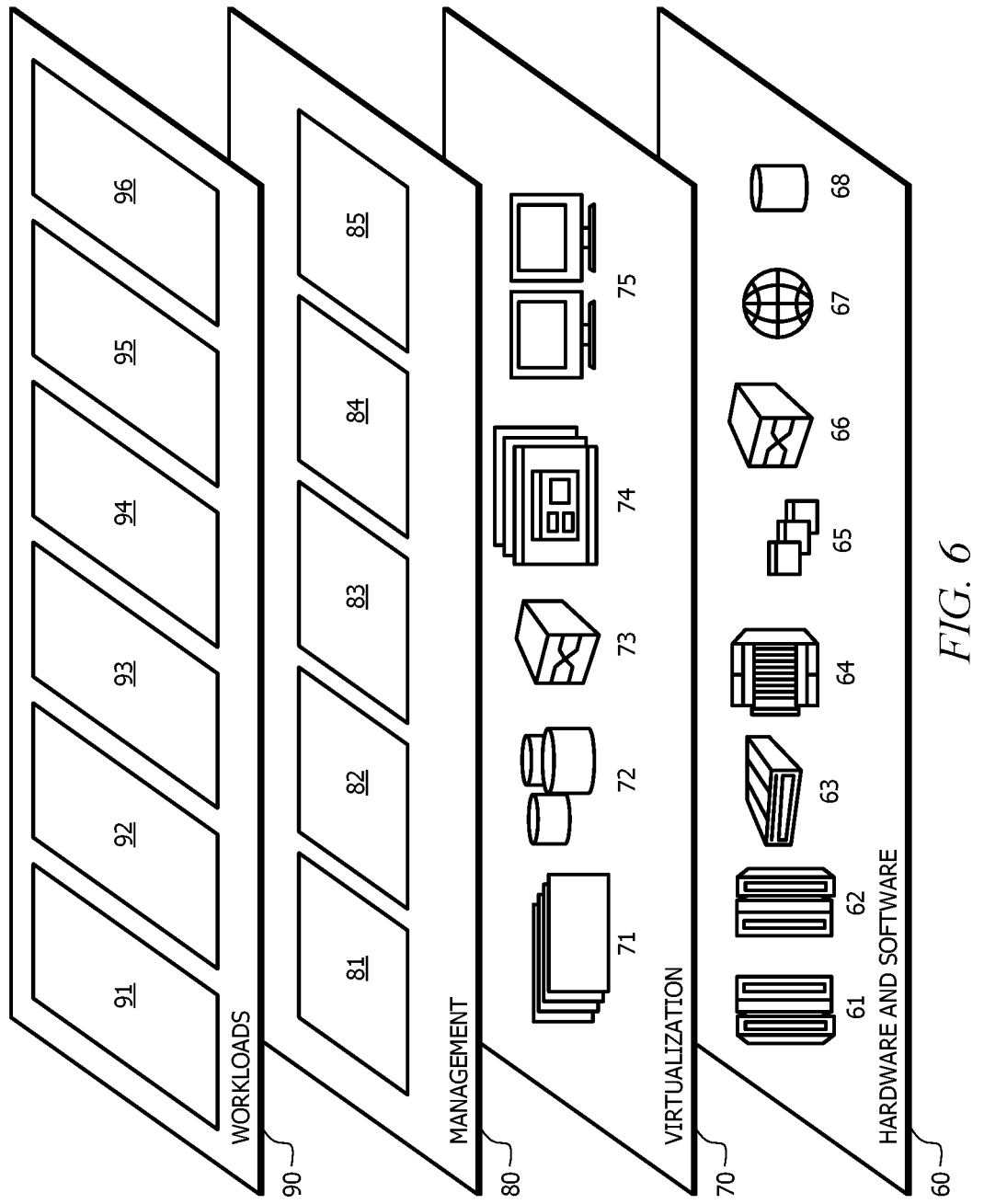
FIG. 6 depicts abstraction model layers according to an embodiment of the present disclosure.

Turning now to FIGS. 5 and 6, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; Reduced Instruction Set Computer (RISC) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive safety alert determination 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for determining a cognitive safety alert, the computer program product comprising a computer readable storage medium having program instructions embodied therewith that when executed by a processor cause the processor to: receive internal data points from a plurality of sensors, wherein the plurality of sensors are configured proximate to the person and configured to send the internal data points comprising one or more of voice data, image data, position data, fingerprint data, or biological data associated with at least one of the person, a mobile electronic device proximate to the person, or surroundings of the person, and activation status and battery level information of the mobile electronic device, the internal data points including at least situational data and biological data; receive external data points; compare the internal data points to the external data points and to a profile of a person; analyze the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person; compare the weighted value to a configurable threshold value; and provide an alert when the weighted value exceeds the threshold value.

2. The computer program product of claim 1, wherein the external data points are selected from a group of Internet accessible sources comprising a social media source, a news source, a blog, an online communication system, an online bulletin board, a weather data source, a traffic data source, a geographic data source, criminal database source, and an image feed.

3. The computer program product of claim 2, wherein the profile of the person is selected from a group of stored sources of information about the person comprising an image of the person, biological data of the person, voice data of the person, and fingerprint data of the person.

4. The computer program product of claim 2, wherein the weighting rules vary depending on the first and second cognitive dimensions.

5. The computer program product of claim 2, wherein the alert is provided automatically to a third-party without providing the alert to the person and without intervention by the person after the alert is provided.

6. The computer program product of claim 2, wherein the alert is provided to the person via an audible or visual indicator and the person is presented an option for forwarding the alert to a third-party.

7. The computer program product of claim 6, wherein the alert is automatically provided to a third-party without intervention by the person when a predefined period of time after the alert is provided to the person has expired without input from the person.

8. A computer implemented method, comprising: receiving internal data points from a plurality of sensors associated with a person, wherein the plurality of sensors are configured proximate to the person and configured to send the internal data points comprising one or more of voice data, image data, position data, fingerprint data, or biological data associated with the person, a mobile electronic device proximate to the person, or surroundings of the person and activation status and battery level of the mobile electronic device, the internal data points including at least situational data and biological data; receiving external data points; comparing the internal data points to the external data points and to a profile of the person; analyzing the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person; comparing the weighted value to a configurable threshold value; and providing an alert when the weighted value exceeds the threshold value.

9. The computer implemented method of claim 8, wherein the external data points are selected from a group of Internet accessible sources comprising a social media source, a news source, a blog, an online communication system, an online bulletin board, a weather data source, a traffic data source, a geographic data source, criminal database source, and an image feed.

10. The computer implemented method of claim 8, wherein the profile of the person is selected from a group of stored sources of information about the person comprising an image of the person, biological data of the person, voice data of the person, and fingerprint data of the person.

11. The computer implemented method of claim 8, wherein the weighting rules vary depending on the first and second cognitive dimensions, and wherein the internal and external data points comprise a combination of structured or unstructured textual data and visual data.

12. The computer implemented method of claim 8, wherein the alert is provided automatically to a third-party without providing the alert to the person and without intervention by the person after the alert is provided or wherein the alert is provided to the person via an audible or visual indicator and the person is presented an option for forwarding the alert to a third-party.

13. A system comprising a processor configured to: receive internal data points from a plurality of sensors associated with a person, wherein the plurality of sensors are configured proximate to the person and configured to send the internal data points comprising one or more of voice data, image data, position data, fingerprint data, or biological data associated with the person, a mobile electronic device proximate to the person, or surroundings of the person, and activation status and battery level of the mobile electronic device, the internal data points including at least situational data and biological data; receive external data points from; compare the internal data points to the external data points and to a profile of the person; analyze the internal data points, the external data points, the profile of the person, and a result of the comparison by applying weighting rules to determine at least one weighted value, where the weighted value is determined according to a first cognitive dimension of an emotional and biological condition of the person and a second cognitive dimension of a situational and contextual condition surrounding the person; compare the weighted value to a configurable threshold value; and provide an alert when the weighted value exceeds the threshold value.

14. The system of claim 13, wherein the external data points are selected from a group of Internet accessible sources comprising a social media source, a news source, a blog, an online communication system, an online bulletin board, a weather data source, a traffic data source, a geographic data source, criminal database source, and an image feed.

15. The system of claim 13, wherein the profile of the person is selected from a group of stored sources of information about the person comprising an image of the person, biological data of the person, voice data of the person, and fingerprint data of the person.

16. The system of claim 13, wherein the weighting rules vary depending on the first and second cognitive dimensions.

17. The system of claim 13, wherein the internal and external data points comprise a combination of structured or unstructured textual data and visual data.

\* \* \* \* \*